US011974591B2

(12) United States Patent
Fink et al.

(10) Patent No.: US 11,974,591 B2
(45) Date of Patent: May 7, 2024

(54) SYSTEMS AND METHODS FOR ACCLIMATIZING FOOD

(71) Applicant: Dry Harvest, LLC, Meridian, ID (US)

(72) Inventors: Jonathan Fink, Meridian, ID (US); Gene Robert Campbell, West Richland, WA (US); Nigel Aaron Weenink, Zillah, WA (US); Niel Campbell, NW Rio Rancho, NM (US)

(73) Assignee: Dry Harvest, LLC, Meridian, ID (US)

( * ) Notice: Subject to any disclaimer, the term of this patent is extended or adjusted under 35 U.S.C. 154(b) by 0 days.

(21) Appl. No.: 18/370,583

(22) Filed: Sep. 20, 2023

(65) Prior Publication Data

US 2024/0090539 A1 Mar. 21, 2024

Related U.S. Application Data

(60) Provisional application No. 63/408,322, filed on Sep. 20, 2022.

(51) Int. Cl.
*A23L 3/40* (2006.01)
*A23B 7/02* (2006.01)
(Continued)

(52) U.S. Cl.
CPC .................. *A23L 3/40* (2013.01); *A23B 7/02* (2013.01); *A23L 3/015* (2013.01); *A23L 5/55* (2016.08); *A23N 12/083* (2013.01); *F26B 25/22* (2013.01)

(58) Field of Classification Search
CPC ... A23L 3/40; A23L 3/015; A23L 5/55; A23B 7/02; A23N 12/083; F26B 25/22; F26B 5/04; F26B 5/02
(Continued)

(56) References Cited

U.S. PATENT DOCUMENTS 5,383,479 A * 1/1995 Winterson ............... A24B 3/04
131/303
5,526,581 A * 6/1996 Winterson ............... A24B 3/04
34/474
(Continued)

FOREIGN PATENT DOCUMENTS

KR 20110002309 * 1/2011
KR 102169120 B1 * 10/2020

OTHER PUBLICATIONS

Waqas Wakil et al.; Sustainable Pest Management in Date Palm: Current Status and Emerging Challenges; Springer International Publishing AG Switzerland is part of Springer Science+Business Media (www. springer.com) 2016.
(Continued)

*Primary Examiner* — John P McCormack
(74) *Attorney, Agent, or Firm* — Dorsey & Whitney LLP

(57) ABSTRACT

A method of acclimatizing dates includes placing a plurality of dates into a vacuum chamber, heating the dates to a first temperature, and increasing a vacuum pressure of the vacuum chamber with the dates in the vacuum chamber. The first temperature is below a boiling point of water at an initial pressure within the vacuum chamber and the increase in vacuum pressure modifies the boiling point to below the first temperature. The method includes adjusting a relative humidity of the vacuum chamber towards a target relative humidity until the plurality of dates reach an equilibrium relative humidity, the target relative humidity corresponding to a target moisture content of the dates on an isotherm of the dates at the first temperature. The method includes cooling the dates to a second temperature to stop transpiration of water within the plurality of dates and decreasing the vacuum pressure of the vacuum chamber.

23 Claims, 5 Drawing Sheets

(51) Int. Cl.
  *A23L 3/015* (2006.01)
  *A23L 5/00* (2016.01)
  *A23N 12/08* (2006.01)
  *F26B 25/22* (2006.01)

(58) Field of Classification Search
  USPC .................................... 34/491, 361, 453, 92
  See application file for complete search history.

(56) References Cited

U.S. PATENT DOCUMENTS

| 2003/0148014 | A1* | 8/2003 | Kanner | A23B 7/02 |
| | | | | 426/639 |
| 2015/0192362 | A1* | 7/2015 | Zielinski | F26B 25/14 |
| | | | | 34/92 |
| 2022/0151980 | A1* | 5/2022 | Leo | A23G 3/366 |
| 2022/0205719 | A1* | 6/2022 | Ersurmeli | F26B 13/14 |
| 2022/0276002 | A1* | 9/2022 | Kozlowski | F26B 9/06 |

OTHER PUBLICATIONS

Kouame Yao et al.; Using dynamic dewpoint isotherms to determine the optimal storage conditions of inert dust-treated hard red winter wheat; Grain & Oil Science and Technology 4 (2020) 127-137 2020.
Shlomo Navarro; Postharvest treatment of dates; Article in Stewart Postharvest Review, Apr. 2006.

* cited by examiner

SYSTEMS AND METHODS FOR ACCLIMATIZING FOOD

RELATED APPLICATIONS

This application claims the benefit of U.S. Provisional Patent Application Ser. No. 63/408,322, filed on Sep. 20, 2022 and entitled "Systems And Methods For Acclimatizing Food," the contents of which are incorporated herein by reference in its entirety.

FIELD OF THE DISCLOSURE

The embodiments described herein relate generally to food processing. More specifically, the embodiments described herein relate to the vacuum drying and processing of agricultural commodities, such as dates.

BACKGROUND

Description of the Related Art

Many food products, particularly fruits, vegetables, and grains, are dried to remove their moisture and inhibit spoilage. During drying, it is desirable to avoid degradation of flavonoids, polyphenols, and antioxidants. One known method to dry fruits is to leave them in the sun for prolonged periods of time—usually several days subject to weather and climate conditions. Another known method is placing the food in a warm room or furnace. Yet another method is to use a food dehydrator, which creates an arid environment and mechanically extracts moisture from the drying chamber using heating elements and fans. The efficiency of drying using these known methods is dependent upon the size and moisture of the foodstuff. Additional factors may affect efficiency, including but not limited to labor, energy costs, and commodity storage. In addition, not all foodstuffs, such as dates, that are harvested together may have the same initial moisture content.

However, known methods of drying can cause loss and exposure to the elements, including humidity, rain, wind, and other elements, which can result in more than 60% loss in crop yield, post-harvest. Furthermore, farmers commonly sell crops at a reduced price when moisture levels are outside the desired range. Solar drying, hot room drying, and furnace drying can be damaging to the quality of the food product and reduce yields. Temperatures above 160° F. (71.11° C.) are commonly used during drying in order to also achieve pasteurization. However, such temperatures can damage the desirable characteristics of the food. In addition, improper processing can negatively impact the nutrients within the foodstuff.

Recent developments have seen improvements in drying by using vacuum drying. For example, atmospheric pressure water vaporizes at 212° F. (100° C.). At 27 in-Hg of vacuum, water will vaporize at 113° F. (45° C.). Therefore, an atmospheric drop of 27 in-Hg increases the vaporization rate without a modification of temperature. Heat is removed by the water vapor and provides evaporative cooling of the product. However, disadvantages of known vacuum drying may exist. For example, known vacuum dryers, like other dryers, may still cause burning of product or damaged integrity during the extraction of water. For example, once the unbound moisture is removed, the rate of moisture removal decreases and the product is more sensitive and volatile in its composition to induced heat, which can cause burning or charring of the food. Furthermore, vacuum drying can result in a food product with too little moisture, particularly if the food product was too dry before the drying process began.

Other problems and disadvantages may exist.

SUMMARY

The present disclosure is directed to systems and methods that overcome or mitigate at least some of the problems and disadvantages discussed above.

The systems and methods disclosed herein may normalize food products that are harvested too wet or too dry and can bring either condition back to optimal conditions to improve product quality. The methods may include adding and/or removing moisture from the food products in order to prepare the food products for human consumption. The method may include removing moisture by drying using a vacuum in a non-freeze/non-sublimation dry process to control water activity through relative humidity while under vacuum. Drying may be accomplished without burning the food product and without compromising the food product's organoleptic properties. In some embodiments, drying may be accomplished with greater efficiency than known methods and may reduce the need for pre-drying labor.

The methods and systems described herein may be applied for the acclimatization of fruits and vegetables. The methods and systems described herein are particularly suitable for processing rice, corn, dates, cacao, carrots, peas, sorghum, eggs, and hemp. The methods and systems may have additional advantages for use with fruits, such as dates, and particularly Medjool dates, which have a high reabsorption rate of ambient moisture. In some embodiments, the method may be applied to foods that can be rehydrated prior to human consumption, such as rice, coffee, and corn.

An embodiment of a method of acclimatizing food includes placing a food product having an initial moisture content into a vacuum chamber, selecting a target moisture content of the food product, and modifying the atmosphere within the vacuum chamber to modify the moisture content of the food product. The method includes increasing a temperature of an atmosphere within the vacuum chamber to a first temperature with the food product in the vacuum chamber. The vacuum chamber has a vapor pressure difference from the food product. The method includes increasing a vacuum pressure of the vacuum chamber with the food product in the vacuum chamber and determining a target relative humidity of the vacuum chamber. The target relative humidity has an equilibrium relative humidity with a corresponding moisture content at the target moisture content. The equilibrium relative humidity is dependent on the temperature of the atmosphere within the vacuum chamber. The method includes modifying the moisture content of the food product until the moisture content of the food product reaches the target moisture content by iteratively measuring a relative humidity within the vacuum chamber and adjusting the relative humidity of the vacuum chamber to the target relative humidity. Once the target moisture content is reached, the method includes reducing the temperature of the atmosphere within the vacuum chamber to a second temperature and reducing the vacuum pressure of the vacuum chamber.

The equilibrium relative humidity may be determined from a dynamic dewpoint sorption isotherm. The target relative humidity may be less than 68%, and preferably less than 65%, and more preferably less than 60%. The target moisture content may be in a range of 18% to 23%. The vacuum pressure may be at least 28.92 in-Hg. The food product may be a plurality of dates. The first temperature may be in a range of 113° F. (46.11° C.) to 122° F. (50° C.).

The method may include emitting water into the vacuum chamber, the moisture content of the food product increasing through sorption. The water may be a structured $H_3O_2$ water. The method may include expelling water vapor from the vacuum chamber through at least one eductor, the moisture content of the food product decreasing through desorption. The method may include ultrasonically vibrating the food product within the vacuum chamber.

An embodiment of a method of acclimatizing dates includes placing a plurality of dates into a vacuum chamber, heating the dates to a first temperature, and increasing a vacuum pressure of the vacuum chamber with the dates in the vacuum chamber. The first temperature is below a boiling point of water at an initial pressure within the vacuum chamber and the increase in vacuum pressure modifies the boiling point to below the first temperature. The method includes adjusting a relative humidity of the vacuum chamber towards a target relative humidity until the plurality of dates reach an equilibrium relative humidity, the target relative humidity corresponding to a target moisture content of the dates on an isotherm of the dates at the first temperature. The method includes cooling the dates to a second temperature to stop transpiration of water within the plurality of dates and decreasing the vacuum pressure of the vacuum chamber.

The first temperature may be in a range of 113° F. (46.11° C.) to 122° F. (50° C.). The method may include operating eductors to remove water vapor from the vacuum chamber. The method may include emitting water into the vacuum chamber. The method may include continuously monitoring a rate of removal of water vapor from the vacuum chamber to determine when the plurality of dates have reached the equilibrium relative humidity. The method may include ultrasonically vibrating the plurality of dates within the vacuum chamber.

An embodiment of a system for acclimatizing foods includes a vacuum pump, a vacuum chamber including a humidity sensor, at least one eductor, a water emitter, a temperature regulator, and a programmable logic controller. The vacuum chamber is in communication with the vacuum pump. The at least one eductor is positioned to expel water vapor from the vacuum chamber. The water emitter is positioned within the vacuum chamber. The temperature regulator is operable to control a temperature within the vacuum chamber. The programmable logic controller is configured to modify a moisture content of a food product within the vacuum chamber by i) increasing a temperature within the vacuum chamber by modifying the operation of the temperature regulator; ii) actuating the vacuum pump to increase a vacuum pressure within the vacuum chamber; iii) iteratively measuring a relative humidity within the vacuum chamber; iv) iteratively adjusting the relative humidity of the vacuum chamber to a target relative humidity by selectively operating the at least one eductor and the water emitter, the target relative humidity corresponding to a target moisture content an isotherm; v) actuating the vacuum pump to decrease a vacuum pressure within the vacuum chamber; and vi) decreasing a temperature within the vacuum chamber by modifying the operation of the temperature regulator.

The system may include a tray for containing the food product. The system may include an ultrasonic vibrator connected to the tray. The system may include a condenser tank, the at least one eductor positioned between the vacuum chamber and the condenser tank.

The temperature regulator may include a first thermally adjustable plate positioned two inches or less from the tray. The temperature regulator may include a first thermally adjustable plate positioned above the tray and a second thermally adjustable plate positioned below the tray.

Figure 1:
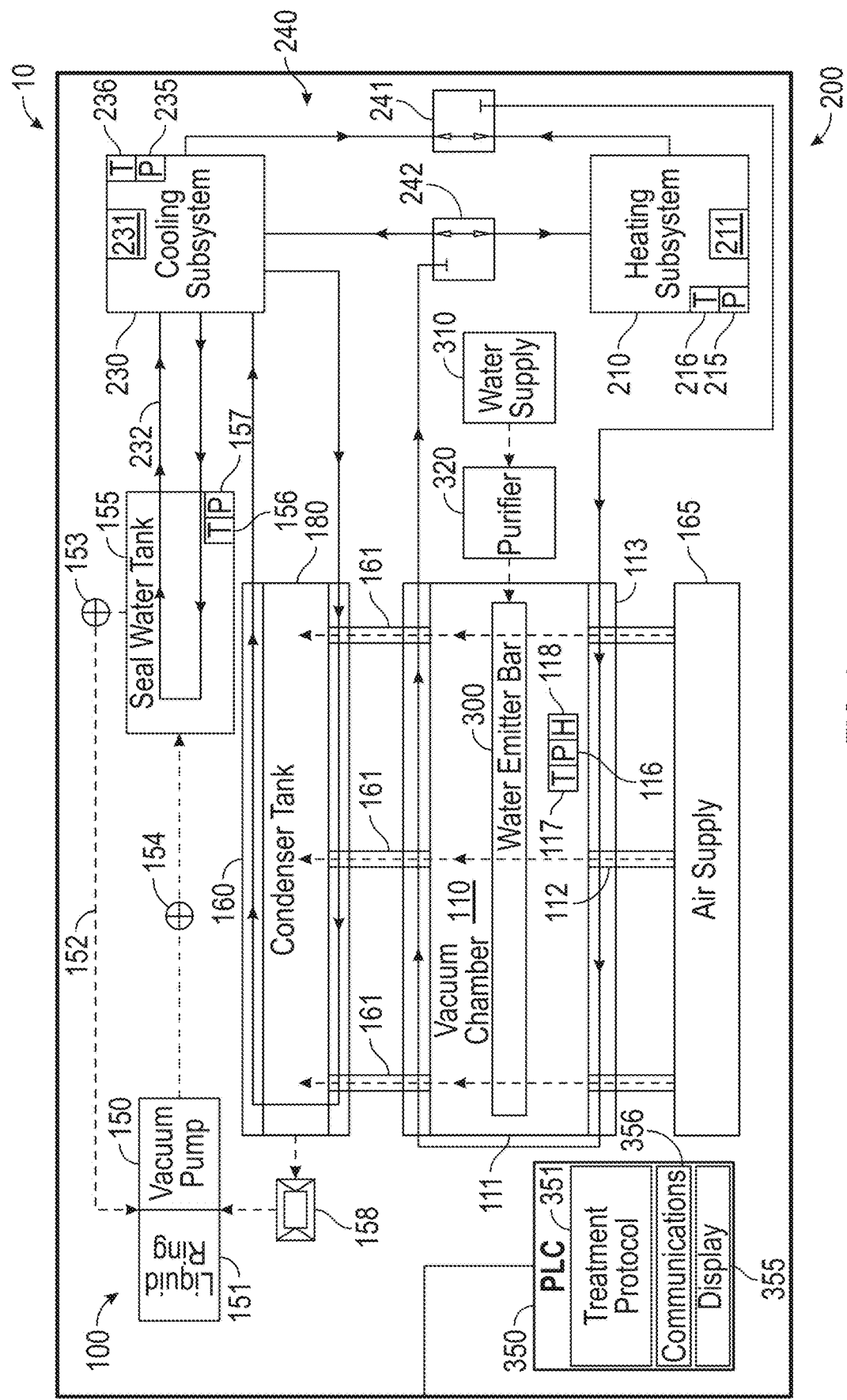
FIG. 1 is a schematic of an embodiment of a system for acclimatizing food products.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DESCRIPTION

FIG. 1 is a schematic of an embodiment of a system 10 for acclimatizing food products. The system 10 includes a vacuum subsystem 100, a temperature regulator 200, a water emitter 300, and a programmable logic controller (PLC) 350. The vacuum subsystem 100 removes atmosphere from within a vacuum chamber 110 while the temperature regulator 200 modifies the temperature within the vacuum chamber 110. The water emitter 300 introduces moisture into the vacuum chamber 110. The PLC 350 is configured to automatically control the vacuum subsystem 100, temperature regulator 200 and water emitter 300 based on sorption isotherms for the food product to be treated to achieve a target moisture level of the food product. Sorption isotherms are curves relating the pressure of water in the food to its water content at constant temperature. The isotherms are preferably dynamic dewpoint sorption isotherms. The PLC 350 stores or accesses treatment protocols 351 that include the isotherms for fruits and vegetables to be treated.

The PLC 350 coordinates the chamber vacuum, chamber temperature, boiling point, relative humidity in the chamber, water activity in the food product, vapor pressure deficit, and exposure timing to acclimatize the foods being treated. The PLC 350 may include a display 355, such as a touch-screen interface. The display 355 shows data received from a plurality of sensors within the system 10. By way of example, the display 355 shows may show a message that the vacuum chamber 110 is "too cold" or "too hot" and that corrective action should be taken before treatment begins. The display 355 may permit a user to access and select a desired treatment protocol 351. The PLC 350 may include a communications module 356, such as cellular network connection or internet connection, for remote monitoring and control. The PLC 350 includes an IP address that permits a user to log into the system 10 from a remote location.

The system 10 is operable to modify the moisture content of the food product by adjusting a relative humidity of the vacuum chamber 110 to a target relative humidity that corresponds with a target moisture content of the food product. Food containing free water gives off moisture in vapor form to its environment when the environment's vapor pressure is less than that of the food. The porosity and hygroscopic characteristics of food products, such as dates, cause these food products to lose or gain moisture depending upon the ambient conditions surrounding them. The loss or gain of moisture can be manipulated by controlling the barometric pressure, temperature, and relative humidity of the vacuum chamber 110. An equilibrium relative humidity is dependent on the temperature of the atmosphere within the vacuum chamber 110.

During processing, the water activity ($a_w$) of food products is modified. If the water activity of a food product is too high, then the moisture present can support the growth of molds, yeasts, and/or bacteria. The amount of available moisture can be reduced to a point which will inhibit the growth of the organisms. Water activity of a food is the ratio between the vapor pressure of the food itself and the vapor pressure of distilled water under identical conditions. The moisture content of a product can be measured as the equilibrium relative humidity (ERH) expressed in a percentage or as the water activity expressed as a decimal, according to the following equation: $a_w$=ERH/100. Within a vacuum environment, the equilibrium relative humidity of the headspace can be measured once equilibrium occurs.

Fruits may lose moisture through desorption or gain moisture through adsorption or absorption until equilibrium moisture content is reached with the relative humidity of the surrounding air. To attain this equilibrium, the fruit either gains or loses moisture depending on the whether the vapor pressure of the surroundings is more or less than the vapor pressure of the fruit. Once the fruit reaches equilibrium moisture content, no further change in moisture content occurs for the given temperature and relative humidity. The equilibrium moisture content achieved through desorption is greater than the equilibrium moisture content achieved through adsorption.

Figure 2:
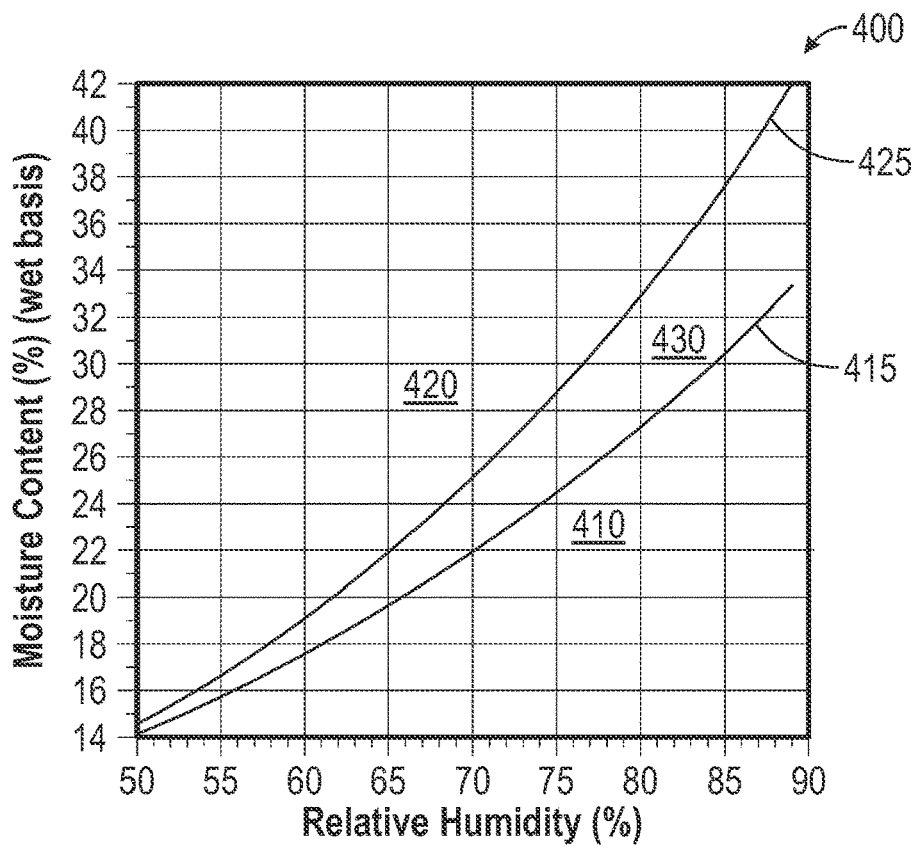
FIG. 2 shows an example of a sorption isotherm of Medjool dates at 78.8° F. (26° C.).

FIG. 2 shows an example of a sorption isotherm 400 of Medjool dates at 78.8° F. (26° C.). The sorption isotherm 400 is dependent upon the temperature and humidity of the atmosphere surrounding the food product, such as the atmosphere within the vacuum chamber 110. The sorption isotherm 400 describes the equilibrium portioning between a sorption phase 410 and a desorption phase 420. A equilibrium phase 430 is bounded by the sorption phase 410 and the desorption phase 420. For example, at 65% relative humidity and 78.8° F. (26° C.), a Medjool date will reach the equilibrium phase 430 at approximately between 20% and 22% moisture content. Depending on the vapor pressure difference between the date and the vacuum chamber 110, the moisture content will either gain through sorption towards the 20% moisture content at the sorption equilibrium relative humidity 415 or lose through desorption towards the 22% moisture content at the desorption equilibrium relative humidity 425. Once the equilibrium phase 430 is reached through desorption, the temperature of the atmosphere must be increased or the humidity of the atmosphere decreased to further reduce the moisture content of the food product.

Freshly harvested vegetable or fruit product will have a higher vapor pressure, usually near 100% relative humidity. As the relative humidity in the vacuum chamber 110 drops, the vapor pressure in the vacuum chamber 110 drops and a vapor pressure deficit will develop between the vapor pressure in the food product and the environment surrounding the food. This vapor pressure deficit will drive either sorption or desorption of the food product being treated.

Referring again to FIG. 1, the vacuum subsystem 100 includes a vacuum chamber 110 and a vacuum pump 150. The vacuum pump 150 modifies the barometric pressure within the vacuum chamber 110. The boiling point of water within the vacuum chamber 110 is a function of the barometric pressure. The vacuum pump 150 will remove some water vapor from within the vacuum chamber 110 as the vacuum pressure is increased. The vacuum subsystem 100 includes one or more pressure gages 116 to measure the pressure within the vacuum chamber 110. The pressure gage 116 may be a digital vacuum gage. In some embodiments, the vacuum subsystem 100 includes a digital vacuum gage and a mechanical vacuum gage. The vacuum subsystem 100 includes one or more temperature sensors 117 to measure the temperature of the ambient air within the vacuum chamber 110. The vacuum subsystem 100 includes one or more relative humidity sensors 118 to measure the relative humidity of the ambient air within the vacuum chamber 110. In some embodiments, a plurality of relative humidity sensors 118 are positioned throughout the vacuum chamber 110.

In some embodiments, the vacuum subsystem 100 includes an anti-backflow valve 158 and an eduction system 160. The anti-backflow valve 158 prevent water or air from backflowing into the vacuum chamber 110 through the vacuum pump 150 when the vacuum pump 150 is not in operation. Relative humidity in the vacuum chamber 110 is reduced through the eduction system 160. The eduction system 160 includes one or more eductors 161 and a pressurized air supply 165. In some embodiments, the eduction system 160 may include a plurality of eductors 161. The plurality of eductors 161 may include an eductor 161 positioned at the first end 111 of the vacuum chamber 110, an eductor 161 positioned in the middle 112 of the vacuum chamber 110, and an eductor 161 positioned at the second end 113 of the vacuum chamber 110. In some embodiments, the vacuum chamber 110 may include a plenum extending along a length of the vacuum chamber 110 with a plurality of eductors 161 distributed along the length of the plenum.

The pressurized air supply 165, such as an air compressor, supplies pressurized air into the eduction system 160 to assist with removing water vapor from the vacuum chamber 110. The eduction system 160 draws water out of the vacuum chamber 110. Water vapor that is removed from the vacuum chamber 110 is provided to a condenser tank 180. The eduction system 160 may utilize Bernoulli-principled eduction. More particularly, the eduction system 160 includes eductors 161 that uses kinetic energy from a stream of compressed fluid, such as pressurized air. Movement of the fluid stream through a tapered tube increases the pressure of the flow and the discharge of the fluid stream creates an area of low pressure that draws in the contents of the vacuum chamber 110. The eductors 161 can be used to remove water vapor while maintaining a substantially constant vacuum pressure.

The use of an eductor 161 is advantageous as it can expel water vapor at a higher rate and with better control than relying solely upon the vacuum pump 150 to remove the water vapor. The eductor 161 permits fluid phase changes to occur outside of the vacuum chamber 110 and within the condenser tank 180, instead of remaining internal to the vacuum chamber 110 as is the common practice in most vacuum dryers. More particularly, the vacuum within the vacuum chamber 110 is pulled through the eductors 161 by the vacuum pump 150. When the motive air is not supplied to the eductors 161, the eductors 161 are considered "closed" as no suction force is created. When the motive air is supplied to the eductors 161, the eductors 161 are considered "open" and a suction force is created to extract water vapor from within the vacuum chamber 110. In addition, an eductor 161 does not have moving parts or require lubrication, which is advantageous in working with food products, working in a vacuum environment, and reducing the potential for contaminants. By operating the eductors 161 at a desired flow rate, the system 10 can stabilize vapor pressure at selected levels.

Preferably, the vacuum pump 150 is a liquid ring vacuum pump 151. The vacuum pump 150 includes a seal water flow control valve 153 and a seal water inlet valve 154. The vacuum subsystem 100 may include a temperature sensor 156 to measure the temperature and a pressure sensor 157 to measure the pressure of the seal water 152 in a seal water tank 155.

The water emitter 300 pressurizes a water supply 310 to generate a fine mist, which is introduced in the vacuum chamber 110 in order to increase the relative humidity within the vacuum chamber 110. The water emitter 300 includes a water supply 310 and a water purifier 320 to filter, purify, pre-treat and energize water prior to atomization into the vacuum chamber 110. The water purifier 320 is advantageous to avoid chlorine, fluoride and other contaminants. The water emitter 300 may energize the water by assimilating a structured $H_3O_2$ water.

The temperature regulator 200 includes a heating subsystem 210, a cooling subsystem 230, and sequencer valving 240. In some embodiments, the heating subsystem 210 and/or the cooling subsystem 230 may be thermoelectric. In some embodiments, the heating subsystem 210 and/or the cooling subsystem 230 may be liquid cooled. The heating subsystem 210 introduces heat into the vacuum chamber 110 to raise the temperature of the food product that is being treated. When the temperature of the food product is raised, pores of the food product are opened to promote the removal or addition of water. The cooling subsystem 230 removes heat from the vacuum chamber 110 to lower the temperature of the food product that is being treated. When the temperature of the food product is lowered, pores of the food product are closed to stop transpiration.

The heating subsystem 210 may include a boiler 211 to heat a coolant up to operational temperature. The operational heating temperature is below the burning point of the sugars of the food product. By way of example, the preferred operational heating temperature for dates ranges from 113-125° F. (46.11-51.67° C.). The coolant circulated throughout the heating subsystem 210 may be propylene glycol. During operation, the ambient temperature within the vacuum chamber 110 does not exceed 125° F. (51.67° C.) in order to avoid charring of the dates. The heating subsystem 210 includes a pressure sensor 215 and a temperature sensor 216 to measure the pressure and temperature of the boiler 211. The heating subsystem 210 may include a boiler reservoir for storing excess heated glycol.

The cooling subsystem 230 may include a chiller 231 to cool a coolant down to the operational cooling temperature. By way of example, the operational cooling temperature may be between 32-50° F. (0-10° C.). The sequencer valving 240 selectively supplies heated coolant from the heating subsystem 210 or cooled coolant from the cooling subsystem 230 to modify the heat within the vacuum chamber 110.

Once the target moisture level of the food product has been reached, heated glycol is removed and stored within the heating subsystem 210. Chilled glycol is then provided to cool the vacuum chamber 110 and the food product (stopping transpiration by closing pores).

The sequencer valving 240 includes an input three-way valve 241 and an output three-way valve 242. The input three-way valve 241 routes coolant to the vacuum chamber 110 and the output three-way valve 242 routes coolant from the vacuum chamber 110. The input three-way valve 241 is switchable to selectively route glycol from the chiller 231 of the cooling subsystem 230 or from the boiler 211 of the heating subsystem 210. The output three-way valve 242 is switchable to selectively route glycol to the chiller 231 of the cooling subsystem 230 or to the boiler 211 of the heating subsystem 210.

The cooling subsystem 230 also cools the seal water 152 of the vacuum pump 150, which brings the temperature of the seal water 152 within the range of 32-50° F. (0-10° C.) and increases the efficiency of the vacuum pump 150. The cooling subsystem 230 may include a cooling loop 232 within the seal water tank 155 to cool the seal water 152. The cooling subsystem 230 may also be used to cool and condense the warm, moisture laden atmosphere that is educted from the vacuum chamber 110 to the condenser tank 180. The condenser tank 180 may include a condenser jacket, which surrounds the condenser tank 180 and receives glycol from the cooling subsystem 230.

The cooling subsystem 230 includes a temperature sensor 236 to measure the temperature of the glycol in the cooling subsystem 230 and a pressure sensor 235 to measure the pressure of the glycol in the cooling system. Additional temperatures sensors may be used to monitor the temperature of the glycol through the system 10.

During operation of the cooling subsystem 230 and the heating subsystem 210, the temperature of glycol within the system 10 is continuously monitored. The glycol may be stored in a reservoir and the average temperature of the glycol may be averaged to ensure that an upper temperature limit is not exceeded when the glycol is combined. If the pressure of the glycol exceeds a preselected limit, such as 16 psi (110316 Pascal), the PLC 350 may open a pressure relief valve to reduce the pressure.

The relative humidity sensors 118 continuously monitor the relative humidity within the vacuum chamber 110. In order to permit the humidity, pressure, and temperature within the vacuum chamber 110 to reach equilibrium, modifications of the operating conditions within the vacuum chamber 110 are implemented periodically by the PLC 350. For example, one minute may elapse between consecutive measurements and/or before additional modifications to the operation conditions are affected. Once a target relative humidity and moisture content has been reached, then the system 10 transitions to a cool down stage. If a target relative humidity has not been reached, then the moisture within the vacuum chamber 110 is further modified.

In some embodiments, the food product being treated may be ultrasonically vibrated to expedite water removal from the food product.

During a drying process, if the ambient temperature of the vacuum chamber 110 begins to fall below a preselected temperature, such as 113° F. (46.11° C.), then the PLC 350 modifies operation of the heating subsystem 210 to increase the temperature of the heated glycol in order to maintain the ambient temperature of the vacuum chamber 110 within the target range for the isotherm of the product.

When the pressure within the vacuum chamber 110 exceeds an upper limit, the one or more eductors 161 may be temporarily opened (by introducing the motive air) to expel water vapor from within the vacuum chamber 110. In some embodiments, the vacuum pump 150 may be designed to limit itself if the pressure exceeds an upper limit, such as 1 atm.

Once the food product has reached its target relative humidity, a cool-down phase is initiated to stop the transpiration process by closing the pores. The temperature of the food product is lowered by replacing the heated glycol with chilled glycol while maintaining the food product at the target relative humidity.

In order to replace the heated glycol with chilled glycol, both of the three-way valves 241, 242 are switched to route coolant from the cooling subsystem 230. If the relative humidity is above the target value, the one or more eductors 161 are temporarily opened to expel water vapor from within the vacuum chamber 110.

If the ambient temperature in the vacuum chamber 110 is above the ambient environmental temperature, then additional cooling is implemented while continuously monitoring the vacuum pressure. If the pressure within the vacuum chamber 110 exceeds an upper limit, such as 750 Torr (29.5 in Hg), the one or more eductors 161 are temporarily opened to expel water vapor from within the vacuum chamber 110. Once the ambient temperature in the vacuum chamber 110 is at or below the ambient temperature outside the vacuum chamber 110, then the vacuum subsystem 100 shut-down process is initiated.

During the vacuum shut-down process, the anti-backflow valve 158 is closed and the pressure within the vacuum chamber 110 is continued to be monitored. If the pressure exceeds a preselected level, such as 0.02 Torr (0.0007874015 in-Hg), then the one or more eductors 161 are periodically temporarily opened and closed until the pressure no longer exceeds that value. The one or more eductors 161 are then opened for a final time, for longer than the prior temporary opening duration.

Figure 3:
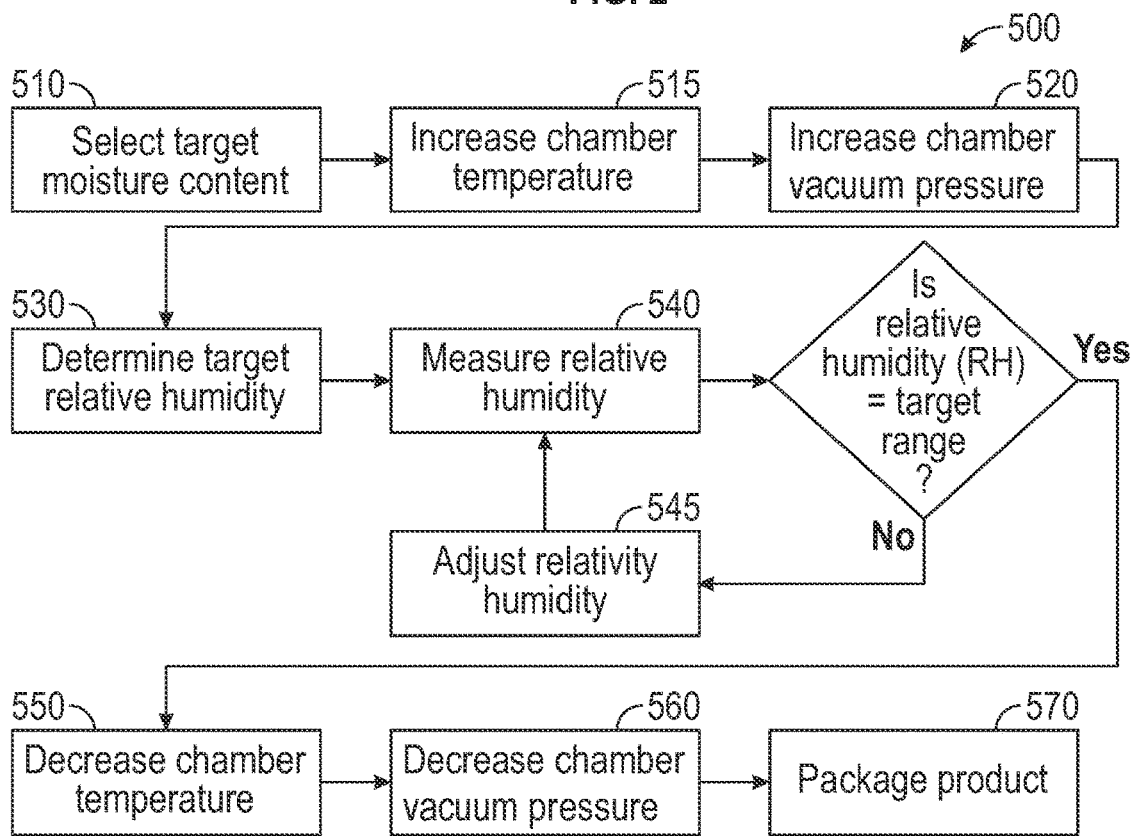
FIG. 3 shows an embodiment of a method of acclimatizing food products, such as dates.

FIG. 3 shows an embodiment of a method 500 of acclimatizing food products. The method may include three stages: a ramp-up stage, a holding stage, and a cool-down stage. To treat the food products, such as dates, it is first loaded into the vacuum chamber. The food products may be placed in the chamber on removable pallets. The food products each have an initial moisture content that is outside the desired range. In step 510, a desired moisture content of the food product is selected. Throughout the method 500, the moisture of the fruit will stabilize within the selected range. During the ramp-up stage, the food products are brought up to a first temperature within the vacuum chamber during step 515. The first temperature is below the boiling point of water at the initial pressure of the vacuum chamber.

Then, in step 520, the vacuum pressure is increased, thereby dropping the boiling point of water to less than the first temperature. This causes water within the dates to turn to water vapor. As a result of the vacuum pressure, the transitional phase change of liquid to vapor is reached at a lower temperature. For example, atmospheric pressure water vaporizes at 212° F. (100° C.). At 27 in-Hg of vacuum, water will vaporize at 113° F. (45° C.). At 28.92 in-Hg of vacuum, water will vaporize at 80° F. (26.67° C.). At 29.2 in-Hg of vacuum, water will vaporize at 70° F. (21° C.). In some embodiments, the vacuum chamber 110 is brought to 28.92 in-Hg or greater.

In step 530, a target relative humidity is determined based on the sorption isotherm for the dates. The target relative humidity has an equilibrium relative humidity with a corresponding moisture content at the target moisture content. The boiling temperature of the ambient internal temperature is used to correlate the vapor pressure using a thermocouple and a relative humidity transducer located inside the vacuum chamber.

The fruits are then held during the holding stage to modify the water content of the food products. The temperature within the vacuum chamber is preferably held substantially constant during the holding stage. The relative humidity within the vacuum chamber is iterative measured (step 550) and adjusted (step 545) towards the target relative humidity. In some embodiments, the vacuum chamber may include a plurality of relative humidity sensors and their value is averaged. A programmable logic controller controls the atmospheric conditions within the vacuum chamber according to the isotherms for the food product and the desired moisture level. When water vapor is needed, it is introduced. When water is in excess, vapor is expelled. An eductor is operated to hold vapor pressure within the vacuum chamber to the desired level, as set forth in the sorption isotherm for that food product. Throughout the ramp-up stage, a holding stage, and a cool-down stage, the ambient humidity of the vacuum chamber is measured (step 540) and is adjusted (step 545) towards the target relative humidity, such as 70% or less. In some embodiments, the target relative humidity is between 65% and 68% for dried fruits. The holding stage may extend until the water activity is stabilized at a desired value. In some conditions, a water activity ($a_w$) of less than 0.60 may be desirable to inhibit microbial proliferation.

In some embodiments, the temperature of the food product may be limited to not exceed 113° F. (45° C.). Surface temperatures within the vacuum chamber may be limited to not exceed 125° F. (51.67° C.). For treatment of dates, ambient air temperatures of 115 to 122° F. (46.11 to 50° C.) may be beneficial for drying and to avoid charring of the food product. During treatment, an isotherm corresponding to the ambient air temperature is used. Higher treatment temperatures may be advantageous to expedite treatment of the food product so long as the temperature limits are not exceeded. For example, water will vaporize at 70° F. (21° C.) at 29.2 in-Hg of vacuum, but treatment temperatures of 115 to 122° F. (46.11 to 50° C.) will expedite the removal of moisture from a food product while also avoiding charring that occurs above 125° F. (51.67° C.). During processing, the temperature and rate of moisture change are controlled to avoid skin-burst and water blistering of food products and to maintain and/or improve appearance and quality. During the cool-down stage, the temperature of the dates is reduced (step 550) and the vacuum pressure is gradually released (step 560). The product is then packaged in step 570.

One benefit of the methods described herein is that less sorting may be needed prior to drying. Ripe fruit will stabilize within the desired range, regardless of the initial moisture content. For example, when treatment follows the isotherms for the particular fruit, pores of the fruit are opened. For fruits that have a moisture content above the equilibrium moisture content, moisture is expelled into the vacuum chamber 110. At the same time, fruits that have a moisture content below the equilibrium moisture content will absorb the moisture from within the vacuum chamber 110.

By way of further example, a process for drying date sugar may have a target moisture content of 5% and the environment temperature may be about 76° F. (24.44° C.). By way of another example, in a process for drying dates to make dried fruit, it may be desirable that the moisture level of dried dates be within the range of 18-23% and it may be desirable to immediately package the dates in at an environment temperature of about 40° F. (4.44° C.) to avoid post-processing moisture absorption.

Figure 4:
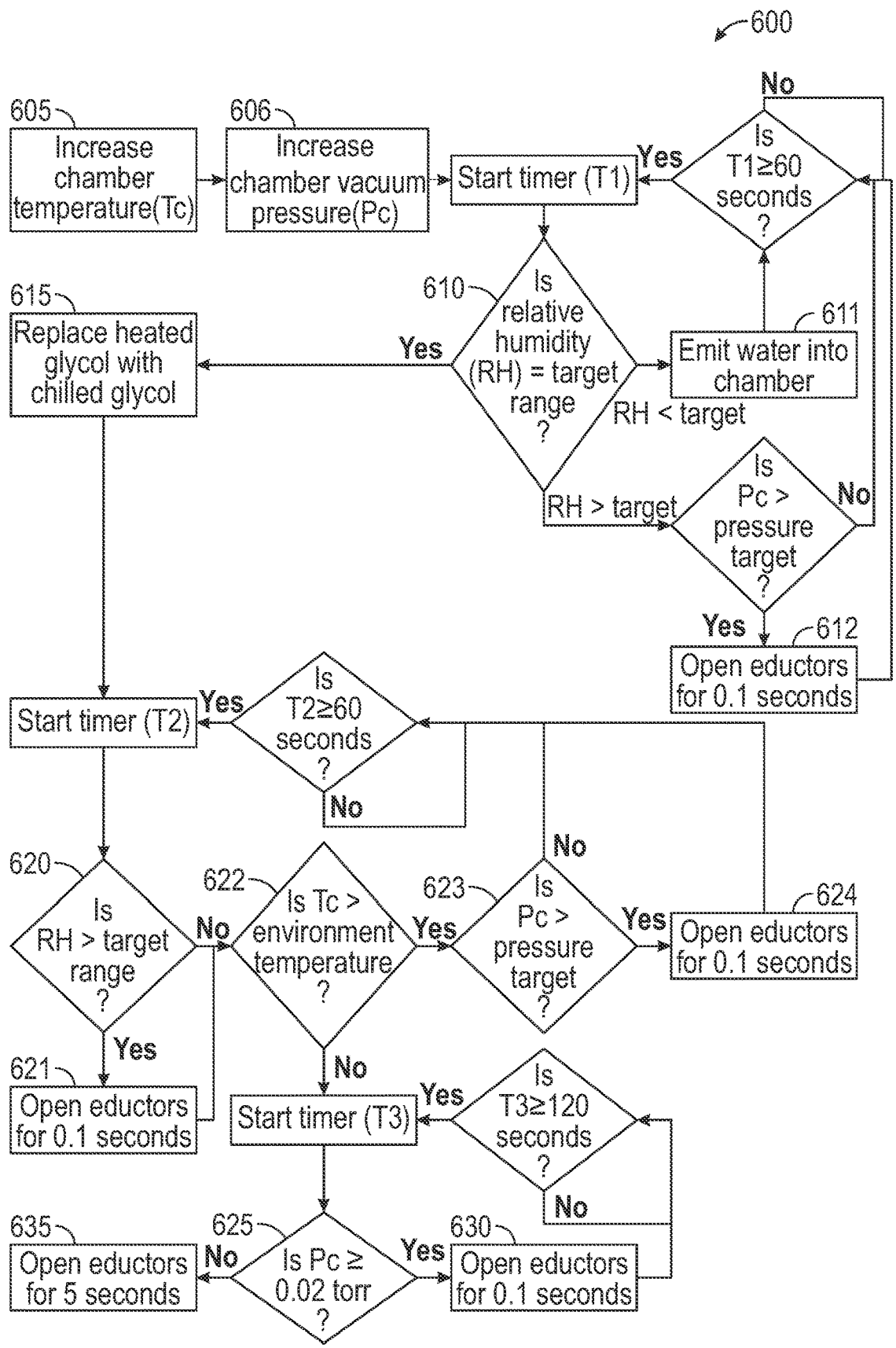
FIG. 4 shows an embodiment of a method of acclimatizing food products, such as dates.

FIG. 4 shows an embodiment of a method 600 of acclimatizing foods. In steps 605 and 606, the vacuum chamber is brought to the desired temperature and the vacuum pressure is increased. In step 610, the PLC iteratively measures the relative humidity within the vacuum chamber to determine whether it is within the desired range. If the relative humidity is below the desired range, then water is emitted into the vacuum chamber in step 611. If the relative humidity is above the desired range, then extraction of moisture from the food product continues. If the pressure within the vacuum chamber exceeds a target pressure, the eductors are opened to adjust the pressure within the system in step 612. The moisture content with the vacuum chamber is iteratively modified until the relative humidity is within the desired range. In some embodiments, the rate of removal of water vapor from the vacuum chamber may be continuously monitored to determine when the food product has reached equilibrium and is within the desired moisture range.

Once the target relative humidity is reached, heat is removed from the vacuum chamber in step 615, such as by replacing heated glycol with chilled glycol. As the food product cools, the relative humidity within the vacuum chamber is iteratively measured in step 620. If the relative humidity exceeds the target range, the eductors are temporary opened to reduce the relative humidity within the vacuum chamber in step 621. The temperature and pressure within the vacuum chamber are then iteratively measured in steps 622 and 623. If the temperature and pressure within the vacuum chamber exceeds a desired limit, the eductors are temporary opened to reduce the temperature and/or pressure within the vacuum chamber in step 624.

Once the ambient temperature in the vacuum chamber is at or below the ambient temperature outside the vacuum chamber, then the vacuum pump is shut down. In step 625, the pressure is iteratively monitored until it exceeds a predetermined level. The pressure within the vacuum chamber is gradually returned to atmospheric pressure by operating the eductors in step 630 and finally in step 635.

Figure 5:
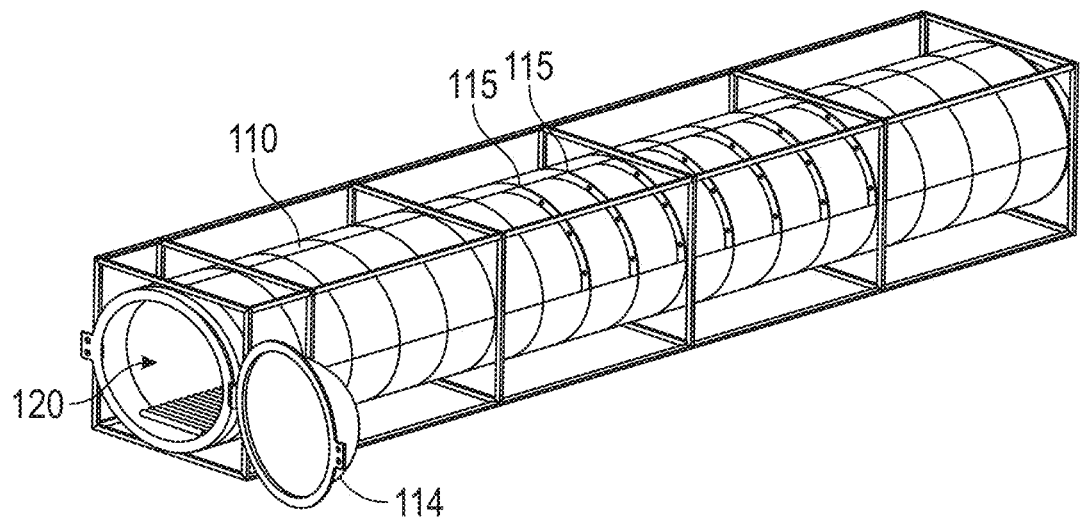
FIG. 5 shows an embodiment of a vacuum chamber.

FIG. 5 shows an embodiment of a vacuum chamber 110. The vacuum chamber 110 has a manway door 114 and may include a plurality of exoskeletal ribs 115 to reinforce the vacuum chamber 110. The vacuum chamber 110 includes a pallet conveyance platform 120 for loading and unloading pallets of food products into the vacuum chamber 110. Depending on the capacity and size of the vacuum chamber 110, it may be desirable for the temperature within the vacuum chamber 110 to be controlled globally, locally, or a combination of both. In some embodiments, it may be suitable to use a vacuum jacket that surrounds the vacuum chamber 110. Heated and cooled coolants are selectively pumped through the vacuum jacket in order to modify the temperature within the vacuum chamber 110. However, thermal radiation has a low efficiency within a vacuum environment so it may be advantageous, particularly in large-scale processing, to utilize local temperature control.

Figure 6:
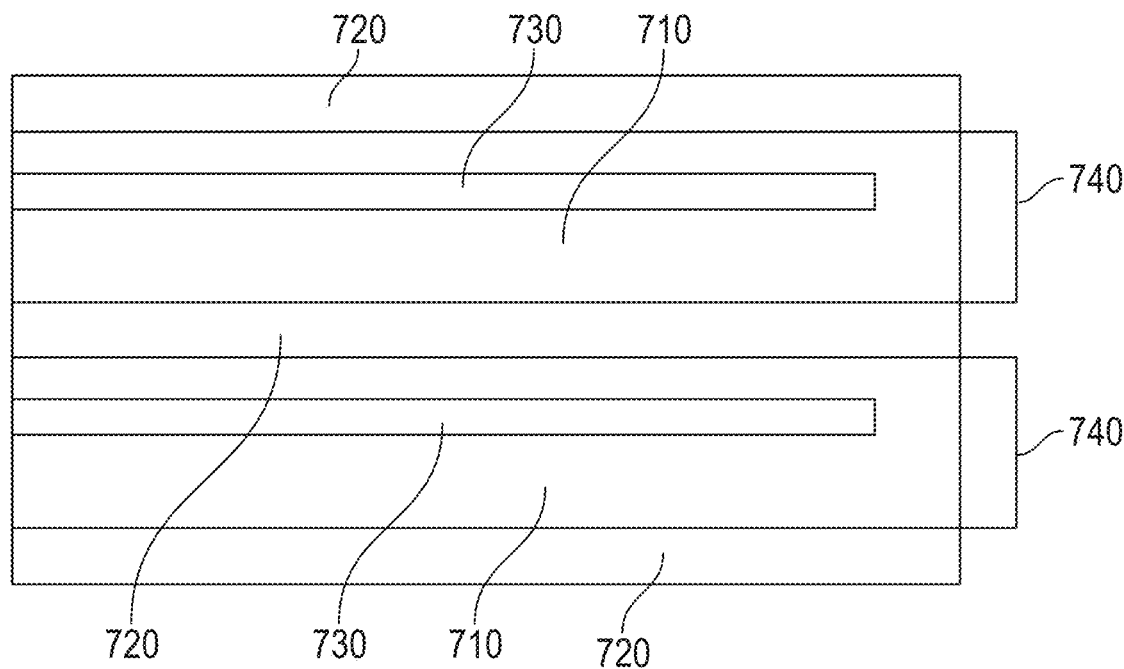
FIG. 6 is a schematic showing an embodiment of a conveyor system with local temperature and humidity control.

FIG. 6 is a schematic showing an embodiment of a conveyor system 700 with local temperature and humidity control. The conveyor system 700 includes a plurality of perforated trays 710 (best shown in FIG. 7) configured to hold food products, such as dates. Each tray 710 includes at least one temperature regulator 720 positioned above and/or below the food product. In some embodiments, a temperature regulator 720 is positioned directly above the food product and another temperature regulator 720 is positioned directly below the tray of the food product. The temperature regulators 720 are positioned adjacent to the tray 710 so that they are within two inches of the food product, and preferably within less than one inch of the food product.

The temperature regulators 720 may be thermally adjustable plates. In some embodiments, the plates are heated and cooled by electricity, such as thermoelectric-peltier plates. In some embodiments, the plates are heated and cooled by a coolant, such as a water manifold. The temperature sensors within the vacuum chamber are located in close proximity to the food product being treated in order to monitor the temperature of the food product. In some embodiments, the temperature sensors may be attached to carts 750 (shown in FIG. 7) that support the food product within the vacuum chamber 110.

The conveyor system 700 includes a plurality of water emitters 730. Each tray 710 includes at least one water emitter 730 positioned to provide structured water to the food products on the tray 710. The conveyor system 700 may include an ultrasonic vibrator 740 configured to vibrate a corresponding tray 710.

Figure 7:
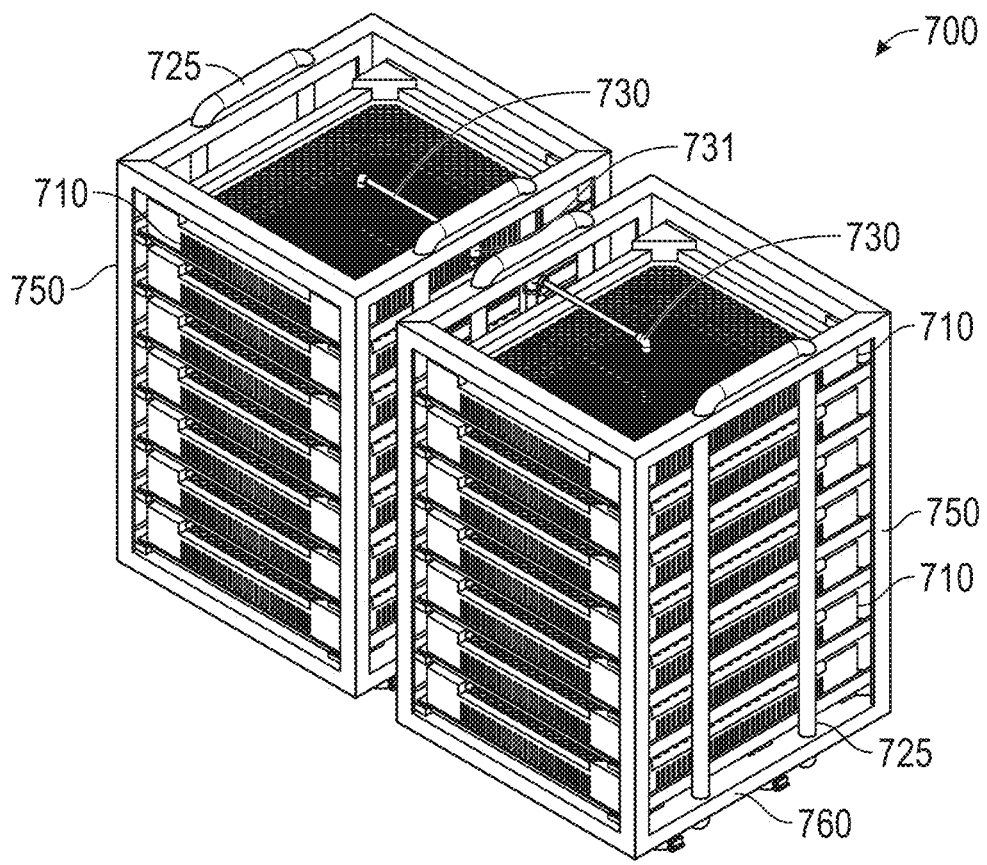
FIG. 7 shows an embodiment of a conveyor system with local temperature and humidity control.

FIG. 7 shows an embodiment of the conveyor system 700 with local temperature and humidity control. The conveyor system 700 includes a plurality of carts 750 with a plurality of trays 710. Water emitters 730 are positioned to provide structured water to the food products on the tray 710. An emitter line 731 is routed through the cart 750 to the plurality of water emitters 730. A plurality of thermal loops 725 extend along the cart 750 to provide heated or chilled glycol to the temperature regulators 720 (shown in FIG. 6) associated with each tray 710. The cart 750 may be positioned upon an omnidirectional rover 760 configured to guide the cart 750 into a vacuum chamber 800 (shown in FIG. 8) and index the location of the cart 750 within the vacuum chamber 800.

Figure 8:
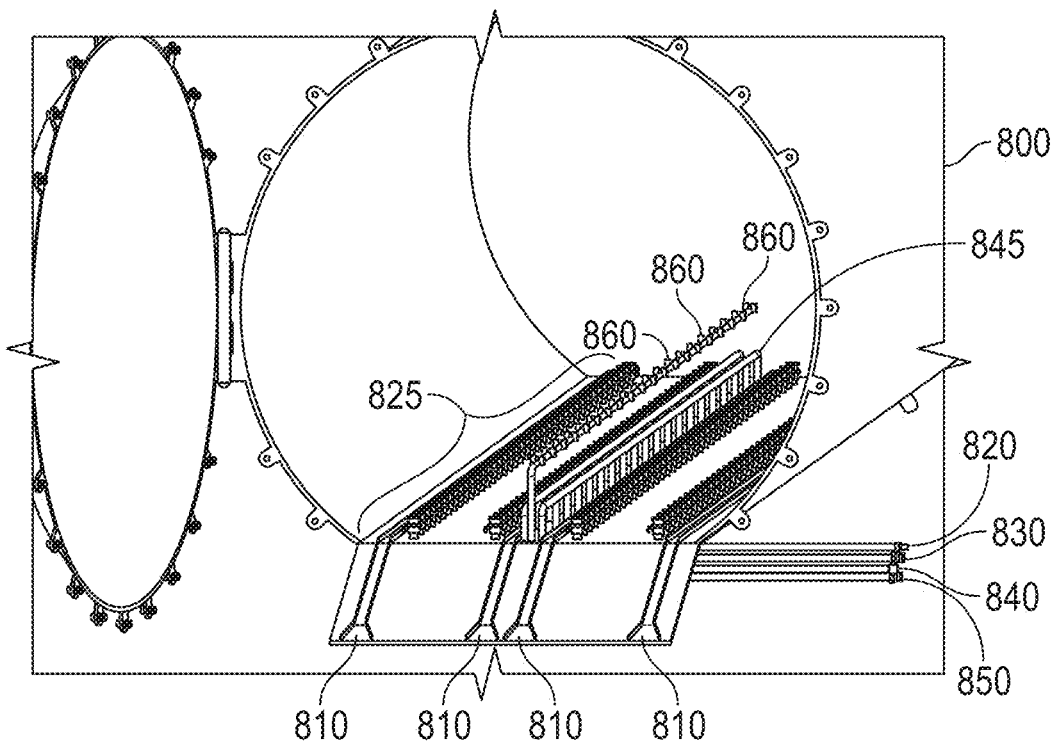
FIG. 8 shows an embodiment of a vacuum chamber.

FIG. 8 shows an embodiment of a vacuum chamber 800. The vacuum chamber 800 includes ramped guide tracks 810 for receiving the omnidirectional rover 760 of the conveyor system 700 (shown in FIG. 7). The vacuum chamber 800 includes a coolant supply line 820, a coolant return line 830, and a water supply line 840. The coolant supply line 820 and coolant return line 830 include coolant ports 825 configured to connect to the thermal loops 725 on the carts 750 (shown in FIG. 7). Coolant, such as propylene glycol, is supplied through the coolant supply line 820, circulates through the thermal loops 725, and exits the vacuum chamber 800 through the coolant return line 830. The thermal loops 725 of the carts 750 are connected to the coolant supply line 820 and coolant return line 830 through a plurality of coolant ports 825 within the vacuum chamber 800. The water supply line 840 is connected to the emitter lines 731 of the carts 750 via a water port 845. The vacuum chamber 800 may include a power supply 850 configured to provide electricity to sensors and data loggers within the vacuum chamber. The vacuum chamber 800 includes a plurality of relative humidity sensors 860 positioned along the length of the vacuum chamber 800.

Although this disclosure has been described in terms of certain preferred embodiments, other embodiments that are apparent to those of ordinary skill in the art, including embodiments that do not provide all of the features and advantages set forth herein, are also within the scope of this disclosure. For example, the embodiments described herein can be used to dry fermented cacao to a moisture content level of 3%.

What is claimed is:

1. A method of acclimatizing food, comprising:
placing a food product into a vacuum chamber, the food product having an initial moisture content;
selecting a target moisture content of the food product;
increasing a temperature of an atmosphere within the vacuum chamber to a first temperature with the food product in the vacuum chamber, the vacuum chamber having a vapor pressure difference from the food product;
increasing a vacuum pressure of the vacuum chamber with the food product in the vacuum chamber;
determining a target relative humidity of the vacuum chamber, the target relative humidity having an equilibrium relative humidity with a corresponding moisture content at the target moisture content, the equilibrium relative humidity is dependent on the temperature of the atmosphere within the vacuum chamber;
modifying the moisture content of the food product until the moisture content of the food product reaches the target moisture content by:
  measuring a relative humidity within the vacuum chamber;
  adjusting the relative humidity of the vacuum chamber to the target relative humidity; and
  continuously monitoring a rate of removal of water vapor from the vacuum chamber to determine when the food product has reached the equilibrium relative humidity;
reducing the temperature of the atmosphere within the vacuum chamber to a second temperature; and
reducing the vacuum pressure of the vacuum chamber.

2. The method of claim 1, wherein the first temperature is in a range of 113° F. (46.11° C.) to 122° F. (50° C.) and the equilibrium relative humidity is determined from a dynamic dewpoint sorption isotherm of the food product at the first temperature.

3. The method of claim 2, wherein the target relative humidity is less than 65%.

4. The method of claim 3, wherein the target moisture content is in a range of 18% to 23%.

5. The method of claim 3, wherein the vacuum pressure is at least 28.92 in-Hg.

6. The method of claim 3, wherein the food product is a plurality of dates.

7. The method of claim 1, wherein modifying the moisture content of the food product until the moisture content of the food product reaches the target moisture content comprises:
iteratively measuring the relative humidity within the vacuum chamber; and
iteratively adjusting the relative humidity of the vacuum chamber to the target relative humidity.

8. The method of claim 1, wherein modifying the moisture content of the food product including emitting water into the vacuum chamber while the vacuum chamber is at the vacuum pressure, the moisture content of the food product increasing through sorption.

9. The method of claim 8, wherein the water is a structured $H_3O_2$ water.

10. The method of claim 1, wherein modifying the moisture content of the food product including expelling water vapor from the vacuum chamber through at least one eductor, the moisture content of the food product decreasing through desorption, and wherein increasing the vacuum pressure of the vacuum chamber includes actuating a vacuum pump to increase the vacuum pressure of the vacuum chamber.

11. The method of claim 10, further comprising ultrasonically vibrating the food product within the vacuum chamber.

12. The method of claim 6, wherein the plurality of dates includes a first group of dates and a second group of dates, the first group of dates having an initial moisture content above the equilibrium relative humidity, the second group of dates having an initial moisture content below the equilibrium relative humidity.

13. A method of acclimatizing dates, comprising:
placing a plurality of dates into a vacuum chamber, the plurality of dates having an initial moisture content;
heating the dates to a first temperature, the first temperature being below a boiling point of water at an initial pressure within the vacuum chamber, wherein the first temperature is in a range of 113° F. (46.11° C.) to 122° F. (50° C.);
increasing a vacuum pressure of the vacuum chamber to 28.92 in-Hg or greater using a vacuum pump with the dates in the vacuum chamber, the increase in vacuum pressure modifying the boiling point to below the first temperature;
iteratively adjusting a relative humidity of the vacuum chamber towards a target relative humidity while holding the temperature within the vacuum chamber substantially constant by selectively emitting water into the vacuum chamber while the vacuum chamber is at the vacuum pressure or expelling water vapor from the vacuum chamber through at least one eductor, the target relative humidity corresponding to a target moisture content of the dates on an isotherm of the dates at the first temperature;
adjusting the relative humidity of the vacuum chamber until the plurality of dates reach an equilibrium relative humidity;
cooling the dates to a second temperature to stop transpiration of water within the plurality of dates; and
decreasing the vacuum pressure of the vacuum chamber.

14. The method of claim 13, wherein the plurality of dates includes a first group of dates and a second group of dates, the first group of dates having an initial moisture content above the equilibrium relative humidity, the second group of dates having an initial moisture content below the equilibrium relative humidity.

15. A method of acclimatizing dates, comprising:
placing a plurality of dates into a vacuum chamber, the plurality of dates having an initial moisture content
heating the dates to a first temperature, the first temperature being below a boiling point of water at an initial pressure within the vacuum chamber;
increasing a vacuum pressure of the vacuum chamber with the dates in the vacuum chamber, the increase in vacuum pressure modifying the boiling point to below the first temperature;
adjusting a relative humidity of the vacuum chamber towards a target relative humidity, the target relative humidity corresponding to a target moisture content of the dates on an isotherm of the dates at the first temperature;
adjusting the relative humidity of the vacuum chamber until the plurality of dates reach an equilibrium relative humidity, wherein adjusting the relative humidity of the vacuum chamber includes operating eductors to remove water vapor from the vacuum chamber;
continuously monitoring a rate of removal of water vapor from the vacuum chamber to determine when the plurality of dates have reached the equilibrium relative humidity;

cooling the dates to a second temperature to stop transpiration of water within the plurality of dates; and decreasing the vacuum pressure of the vacuum chamber.

16. The method of claim 15, wherein the first temperature is in a range of 113° F. (46.11° C.) to 122° F. (50° C.).

17. The method of claim 15, wherein adjusting the relative humidity of the vacuum chamber includes emitting water into the vacuum chamber.

18. The method of claim 15, further comprising ultrasonically vibrating the plurality of dates within the vacuum chamber.

19. A system for acclimatizing foods comprising:
a vacuum pump;
a vacuum chamber in communication with the vacuum pump, the vacuum chamber including a humidity sensor;
at least one eductor positioned to expel water vapor from the vacuum chamber;
a water emitter positioned within the vacuum chamber;
a temperature regulator operable to control a temperature within the vacuum chamber; and
a programmable logic controller configured to modify a moisture content of a food product within the vacuum chamber by:
increasing a temperature within the vacuum chamber by modifying the operation of the temperature regulator;
actuating the vacuum pump to increase a vacuum pressure within the vacuum chamber;
iteratively measuring a relative humidity within the vacuum chamber;
iteratively adjusting the relative humidity of the vacuum chamber to a target relative humidity by selectively operating the at least one eductor and the water emitter, the target relative humidity corresponding to a target moisture content an isotherm;
actuating the vacuum pump to decrease a vacuum pressure within the vacuum chamber; and
decreasing a temperature within the vacuum chamber by modifying the operation of the temperature regulator.

20. The system of claim 19, further comprising:
a tray for containing the food product; and
an ultrasonic vibrator connected to the tray.

21. The system of claim 19, further comprising a condenser tank, the at least one eductor positioned between the vacuum chamber and the condenser tank.

22. The system of claim 19, further comprising a tray for containing the food product, and wherein the temperature regulator includes a first thermally adjustable plate positioned two inches or less from the tray.

23. The system of claim 22, wherein the first thermally adjustable plate is positioned above the tray, and further comprising a second thermally adjustable plate positioned below the tray.

* * * * *